United States Patent
Fitz

(10) Patent No.: US 8,477,885 B2
(45) Date of Patent: Jul. 2, 2013

(54) RECURSIVE FREQUENCY ESTIMATION

(75) Inventor: Michael Paul Fitz, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 64 days.

(21) Appl. No.: 12/931,022

(22) Filed: Jan. 21, 2011

(65) Prior Publication Data

US 2012/0189043 A1    Jul. 26, 2012

(51) Int. Cl.
*H04L 27/06*    (2006.01)

(52) U.S. Cl.
USPC .......................................... 375/344; 375/341

(58) Field of Classification Search
USPC .................................. 375/341, 345
See application file for complete search history.

(56) References Cited

U.S. PATENT DOCUMENTS

| | | | |
|---|---|---|---|
| 4,929,954 A | 5/1990 | Elleaume | |
| 4,965,761 A | 10/1990 | Schlunt | |
| 4,972,358 A | 11/1990 | Welles, II et al. | |
| 5,258,941 A | 11/1993 | Newberger et al. | |
| 6,208,946 B1 | 3/2001 | Arakawa et al. | |
| 7,075,948 B2 | 7/2006 | Makarov | |
| 2002/0016807 A1 | 2/2002 | Takaoka | |
| 2002/0029234 A1 | 3/2002 | Takaoka | |
| 2003/0231718 A1* | 12/2003 | Jiang | 375/326 |
| 2006/0126760 A1* | 6/2006 | Pliquett et al. | 375/321 |
| 2007/0268980 A1* | 11/2007 | Brannstorm et al. | 375/265 |
| 2009/0129514 A1* | 5/2009 | Twitto | 375/341 |

OTHER PUBLICATIONS

Lottici & D'Andrea; Channel Estimation for Ultra-Wideband Comms.; IEEE Journal on Selected Areas of Communications; vol. 20, No. 9, Dec. 2002.

* cited by examiner

*Primary Examiner* — Curtis Odom
(74) *Attorney, Agent, or Firm* — Carmen Patti Law Group, LLC

(57) ABSTRACT

A system for receiving signals is set forth. The system includes an open loop frequency offset updating system adapted to receive an input signal. The open loop frequency offset updating system updates a frequency offset recursively, using a real time update value for value $\Gamma(f,N)$. The system samples the signal and calculates an alternate quantity based on $\Gamma(f,N)$ to determine a maximum value of the alternate quantity.

4 Claims, 1 Drawing Sheet

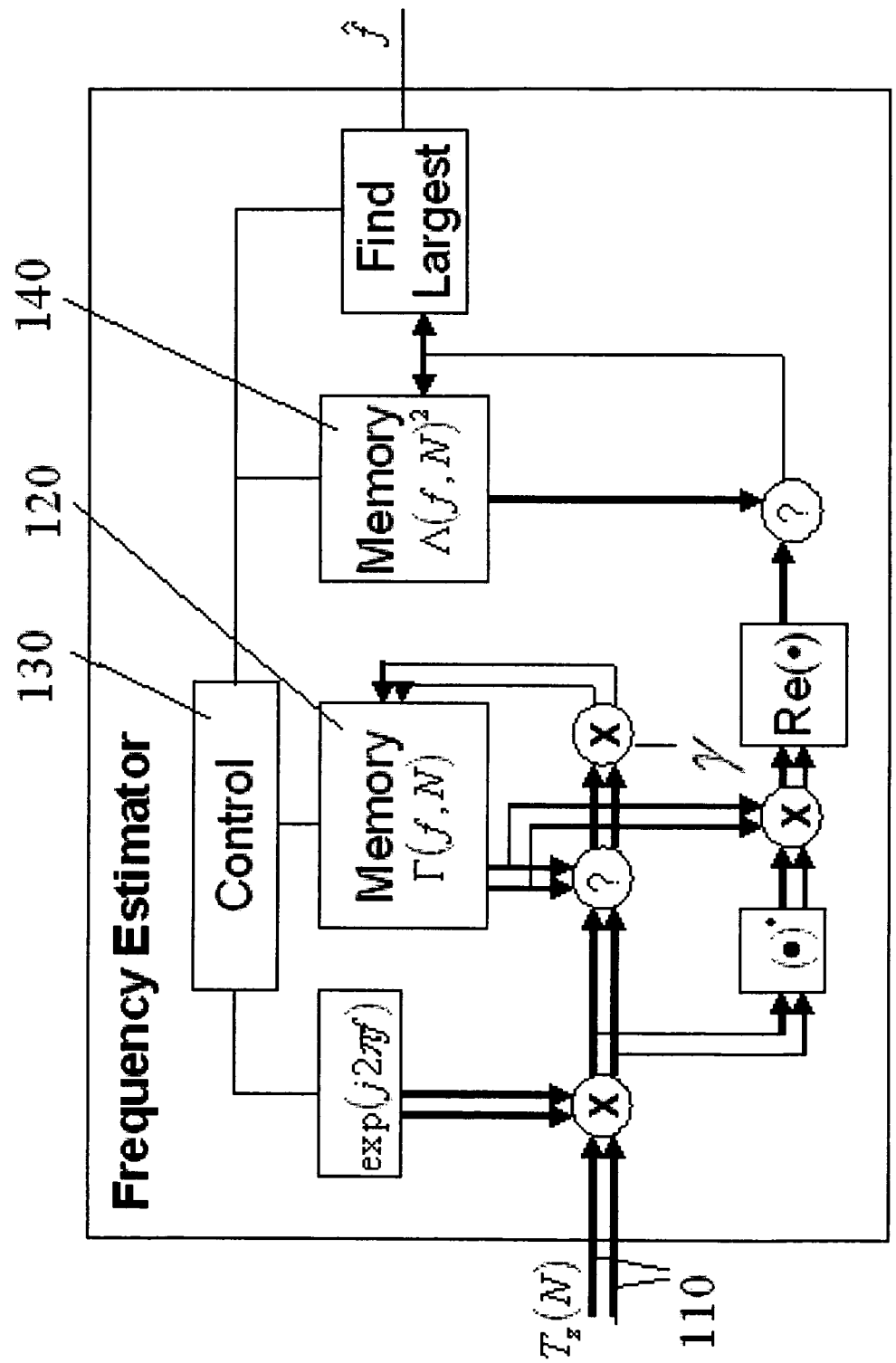

RECURSIVE FREQUENCY ESTIMATION

FIELD OF THE INVENTION

The present disclosure is directed to a frequency estimator. More specifically, the present disclosure is directed to a frequency estimator having a recursive architecture for unmodulated signals.

BACKGROUND

Frequency estimation techniques are used to synchronize the clock in communication systems. The clock received with the communication has a frequency offset from the internal clock of the receiver. Determining the offset and adjusting the internal clock by the frequency offset is necessary to achieve good performance in a communication system.

Frequency estimation at low signal to noise ratio (SNR) is needed for modern coding schemes. However, frequency estimation often has a threshold effect at low SNR. As the SNR decreases, a significant degradation of performance of the system occurs.

High performance frequency estimation is often complex, due to the number of calculations necessary, and non-recursive.

Classical optimum frequency estimators employ system data to compute a periodogram by Fourier transforming the signal using, for example, discrete fourier transform (DFT). Getting an accurate estimate using this method requires computation of a large number of frequency points. Such an estimator is suitable for one-shot block processing.

Known estimators apply either single-shot DGFT processing or simplified recursive processing.

One example of a simplified recursive processor has been discussed, for example, by Umberto Mengali, wherein an estimator chooses the value with the greatest frequency, and recomputes the estimator each time.

In order to accommodate the performance and costs associated with synchronization applications, a low complexity recursive formulation is needed.

SUMMARY

A recursive architecture computes the maximum likelihood (ML) estimate of frequency offset. The ML estimator uses all data to estimate the frequency offset. Frequency points can be computed serially, in parallel, or in some combination based on the selected update rate based on an alternate quantity.

BRIEF DESCRIPTION OF THE DRAWINGS

FIG. 1 illustrates an embodiment of a frequency estimator adapted to receive and compute a recursive value for the estimator from an unmodulated input signal.

DETAILED DESCRIPTION

In accordance with the principles herein, a recursive DFT based estimator is achieved that provides both good performance and low complexity.

Thus, as illustrated in FIG. 1, for each frequency f at time N an alternate quantity $\tilde{\Lambda}(f,N)^2$ to the absolute value of the periodogram can be derived responsive to an input signal 110 with a system, shown generally at 100 that achieves a peak value at the same frequency as the classical optimum estimator.

The input signal 110 for a frequency estimation algorithm is given as $$T_z(n) = T_I(n) + jT_Q(n) = \sqrt{P_S}\exp(j2\pi f_0 n + j\phi) + N(n).$$

In accordance with the principles herein, it is assumed that N(n) is an additive white Gaussian noise. For a system 100 wherein N(n) is additive white Gaussian noise, the maximum likelihood frequency estimator is given as $$\hat{f}_{ML} = \arg\max_{f \in [-0.5, 0.5]} \left| \sum_{n=1}^{N} T_z(n)\exp[-j2\pi fn] \right| = \arg\max_{f \in [-0.5, 0.5]} \Lambda(f, N).$$

Two metrics need to be recursively computed from an input signal to implement the ML estimator, such as, for example, $$\Lambda(f, N) \text{ and } \Gamma(f, N) = \sum_{n=1}^{N} T_z(n)\exp[-j2\pi fn].$$

Since the recursion for $\Gamma(f,N)$ is straightforward, as $$\Gamma(f, N) = \sum_{n=1}^{N} T_z(n)\exp[-j2\pi fn] = \Gamma(f, N-1) + T_z(N)\exp[-j2\pi fN].$$

represents phase noise of the signal, and is stored in a memory device 120 provided in or operatively connected to the system 100.

Without loss of optimality, the ML metric can be $\Lambda(f,N)^2$, and a similar recursion for $\Lambda(f,N)^2$ is enabled since $$\Lambda(f, N)^2 = \left| \sum_{n=1}^{N} T_z(n)\exp[-j2\pi fn] \right|^2$$
$$= |\Gamma(f, N-1) + T_z(N)\exp[-j2\pi fN]|^2$$
$$= |\Gamma(f, N-1)|^2 + |T_z(N)|^2 +$$
$$2\text{Re}[\Gamma(f, N-1)(T_z(N))^*\exp[j2\pi fN]]$$
$$= \Lambda(f, N-1)^2 + |T_z(N)|^2 +$$
$$2\text{Re}[\Gamma(f, N-1)(T_z(N))^*\exp[j2\pi fN]].$$

As $|T_z(N)|^2$ and constants are not frequency dependant quantities, these terms can be ignored in the computation of the ML estimator, i.e., $$\tilde{\Lambda}(f,N)^2 = \tilde{\Lambda}(f,N-1)^2 + Re[\Gamma(f,N-1)(T_z(N))^*\exp[j2\pi fN]].$$

As a result, the ML estimator uses all data to estimate the frequency offset. Further, if phase noise is present in the system, it is important to place too much weight on the earlier data in the offset calculation. Over reliance on the phase noise is easily avoided in the system, employing a recursive algorithm, constructed in accordance with the principles herein. To this end, an exponentially weighting factor is applied in the update of $\Gamma(f, N)$, i.e., $$\Gamma(f,N) = \gamma\Gamma(f,N-1) + T_z(N)\exp[-j2\pi fN].$$

The structure of the estimator is useful for digital implementation as the accuracy of the frequency estimation is determined by the number of discrete frequency points that are considered and the updates for each of these different frequency points can either computed serially or in parallel (or some combination) depending on the update rate that needs to be maintained.

The memory device 120 can include, for example, any suitable data storage mechanism or device, such as, for example, a server, ROM, RAM, or other suitable digital device adapted and constructed to perform operations in accordance with the principles herein or incorporated into other digital devices. An alternate quantity $\tilde{\Lambda}(f,N)^2$, is then computed and stored either in the memory device 120 via a control 130 or in a separate, suitable memory device, such as device 140 shown in FIG. 1, depending on the requirements of the system 100. The alternate quantity can be computed recursively using the relationship between the alternate quantity and $\Gamma(f,N)$ in the calculation of the frequency estimator. For each signal received, a system constructed in accordance with the principles herein advantageously simplifies the update to the estimator based on the recursive nature of the estimator, and the inherent parallelism of modern digital signal processing can be advantageously applied as well. As a result, each frequency can be processed in parallel, serially, or both serially and in parallel, in accordance with the principles herein. Further, each calculation of the estimator can be updated using $\tilde{\Lambda}(f,N)^2$ and, $\Gamma(f,N)$, which removes phase noise, for each signal sample. As a result, the frequency estimate is the value of f that produces a maximum value for $\tilde{\Lambda}(f, N)^2$.

The system 100 eliminates the need and cost for a complex system to compute and update the frequency offset between a locally generated clock of the system 100 and a received clock. After the offset frequency is determined, the signal can be locked and the data demodulated.

If there is an offset frequency, then the system 100 makes a best estimate of the difference between the locally generated clock and the received clock.

In accordance with the principles herein, a simple way to make the frequency offset estimate recursive is achieved. In accordance with these principles, the estimator is updated with a limited number of computations N+1, whereas the known systems use all of the data over. Thus, the system 100 herein only calculates $\Gamma$ to have a simple way to find a maximum for $\lambda$, as for each new signal sample $\Lambda(f,N)^2$ can be derived from $\Gamma(f,N)$, which removes phase noise, and the frequency offset can be updated based on the offset so generated. In other words, the system 100 provides a frequency estimate based on the value of the frequency f that produces the maximum value of $\Lambda(f,N)^2$. The estimator of the system 100 constructed in accordance with the principles herein uses all data to calculate the frequency offset. By applying an exponentially weighting factor to the update, avoids undue reliance on a phase noise aspect in the frequency offset estimate is avoided, given the assumption that N(n) is an additive white Gaussian noise.

A system and method constructed in accordance with the principles herein is suitable for use in systems wherein unmodulated signal are received, such as, for example, antennas, automotive electronics, avionics, communications systems, electronics, energy systems, lasers, materials, MEMS, military, photonics, satellite communications, semiconductors, sensors, space, superconductors, medical equipment, musical instruments, and associated devices, and other systems adapted to receive unmodulated input signals.

Further, the simple recursive architecture of a system constructed in accordance with the principles herein is optimized for implementation in digital integrated circuits, and in systems implementing or in operative communication with digital integrated circuits.

Thus, in accordance with the principles herein, near optimum estimation performance is achieved in a simple recursive architecture that is optimized for implementation in digital integrated circuits, and in systems implementing or in operative communication with digital integrated circuits.

The embodiment(s) set forth herein include principles achieved via a system and method adapted and constructed to operatively facilitate demodulation of communication data packets between transmitting and receiving devices. As such, each exemplary system or method herein contemplates the operative connection of signals to a communication, wireless, or other network over which data is capable of being transmitted between devices.

The embodiments herein have been described and shown for purposes of illustration only, and are not to be construed as constituting any limitations of the present principles. Modifications will be obvious to those skilled in the art, and all modifications that do not depart from the spirit of the principles herein are intended to be included within the scope of the appended claims. Those skilled in the art will appreciate that the conception upon which this disclosure is based, may readily be utilized as a basis for the designing of other structures, methods and systems for carrying out the several purposes of the present principles.

Therefore, the foregoing is considered as illustrative only of the principles herein. Further, since numerous modifications and changes will readily occur to those skilled in the art, it is not desired to limit the principles to the exact construction and operation shown and described, and accordingly, all suitable modifications and equivalents may be resorted to, falling within the scope of the principles described herein.

What is claimed is:

1. A method of generating a recursive maximum likelihood (ML) frequency estimator in a digital integrated circuit comprising one or more memory devices and operatively connected to a network, comprising the steps of:
   determining, in a digital integrated circuit comprising one or more memory devices and operatively connected to a network, a frequency f of a digital signal at a time period N;
   forming, in the digital integrated circuit, an alternate quantity, $\tilde{\Lambda}(f, N)^2$;
   computing, in the digital integrated circuit, the alternate quantity recursively by recursively determining an updated value $\Gamma(f,N)$ at a predetermined update rate, and using the updated value to update $\tilde{\Lambda}(f, N)^2$ to determine the maximum value of $\tilde{\Lambda}(f, N)^2$; and
   estimating the maximum likelihood frequency as the value of f that produces the maximum value of $\tilde{\Lambda}(f, N)^2$.

2. A system for receiving signals comprising:
   an open loop frequency offset updating system adapted to receive an input signal, for updating a frequency offset recursively using a real time update value for value $\Gamma(f, N)$, wherein f is a frequency of a digital signal and wherein N is the time when the frequency is determined, by sampling the signal and calculating an alternate quantity based on $\Gamma(f,N)$ to determine a maximum value of the alternate quantity, and thereby to estimate the maximum likelihood frequency as the value of f that produces the maximum value of the alternate quantity.

3. The system claimed in claim 2, wherein a combined carrier synchronization is provided in a digital rerotation system operatively connected to the open loop frequency offset updating system of claim 2.

4. The system claimed in claim 3, wherein the alternate quantity is further defined by applying an exponentially weighting factor to the alternate quantity.

* * * * *